Patented June 26, 1928.

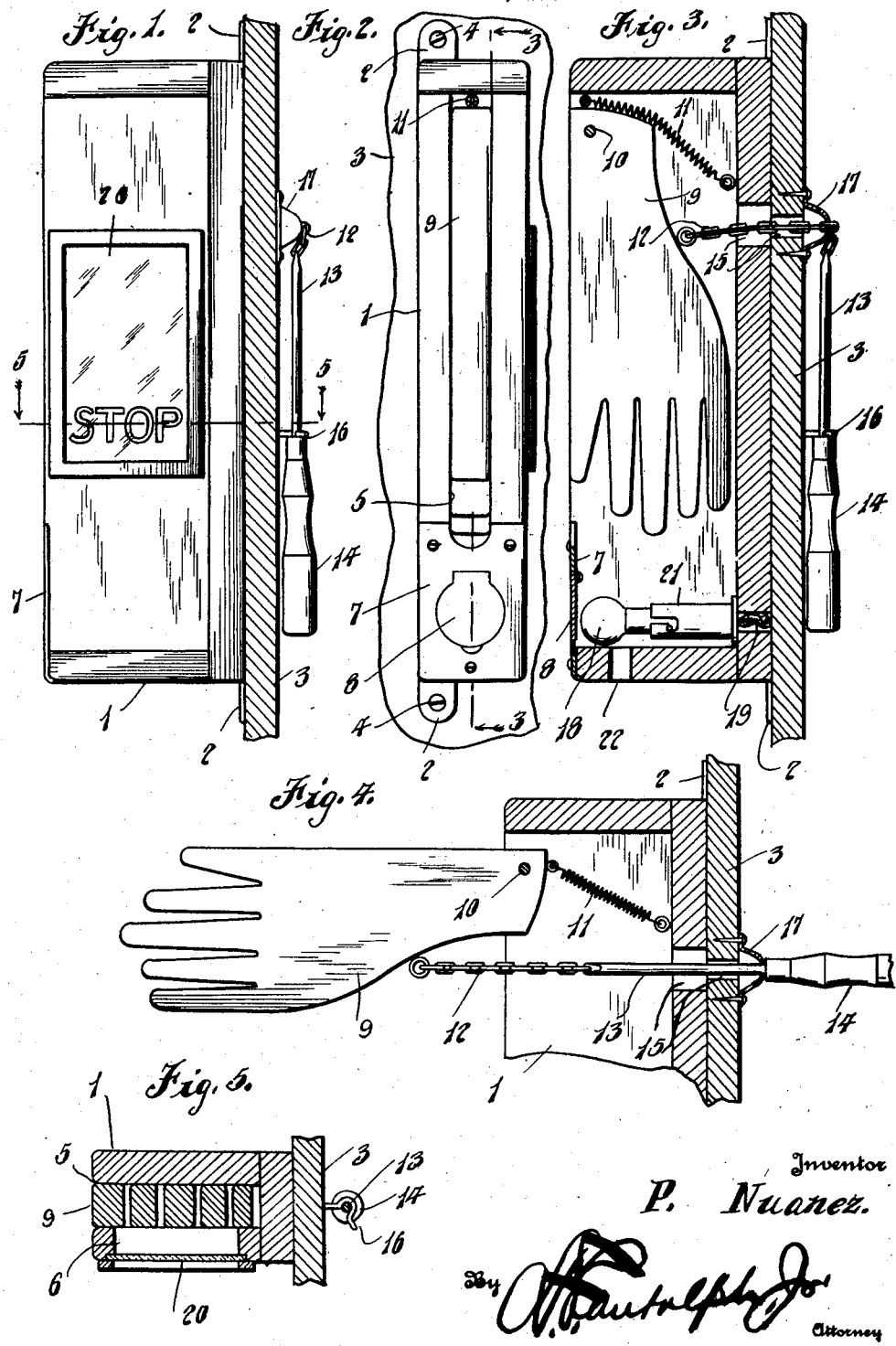

1,674,690

UNITED STATES PATENT OFFICE.

PERFECTO NUANEZ, OF HOLBROOK, ARIZONA.

AUTOMOBILE SIGNAL.

Application filed February 17, 1927. Serial No. 169,021.

This invention relates to a signal through the medium of which the driver of an automobile may indicate his intention to change the direction in which he is traveling, and has for one of its objects to provide a novel, simple and inexpensive device of this character that may be used on an automobile of the closed or open type and that shall embody a casing, a signalling member or hand pivoted within the casing, and means by which the signalling member or hand may be easily and quickly operated to effect its projection or movement into signalling position or its retraction or movement into non-signalling position.

A further object of the invention is to provide a signal of the character stated which shall include a stop sign and means for illuminating the signalling member or hand and the stop sign at night, which may be readily secured to that door of the automobile nearest the driver, and which shall be equipped with a mirror adapted to enable the driver to obtain a view of the road in rear of the automobile.

With the foregoing and other objects in view, the invention consists of the construction, combination and arrangement of parts hereinafter fully described and claimed, and illustrated in the accompanying drawing, wherein:

Figure 1 is a view illustrating the application of the signal to a door of an automobile, the signal being in rear elevation and the door in vertical section, Figure 2 is a view in end elevation of the signal, Figure 3 is a vertical sectional view taken on the planes indicated by the line 3—3 of Figure 2, Figure 4 is a sectional view of the upper portion the signal with the signalling member or arm in projected or signalling position, and Figure 5 is a horizontal sectional view taken on the plane indicated by the line 5—5 of Figure 1.

The signal comprises a casing 1 which is of narrow elongated formation and is adapted to be secured in upright position to that door of an automobile nearest the driver. The casing 1 is provided at its upper and lower ends with ears 2 to enable it to be readily secured to the automobile door 3 by screws 4 or other suitable elements. The casing 1 is provided in its outer lateral side with an opening 5 and in its rear side with an opening 6. The opening 5 extends from the top to within a short distance of the bottom of the casing 1, and the outer lateral wall 7 of the casing is provided with a door 8.

A signalling member 9 which is preferably in the form of a hand, is arranged within the casing 1, and is pivoted at its upper end to the casing as at 10. A spring 11 is connected to the upper end of the signalling member 9 and to the inner lateral wall of the casing 1, and is adapted, when the signalling member is released, to move said member into and hold it in signalling position. When the signalling member 9 is in this position it projects horizontally from the casing 1, as illustrated in Figure 4. The signalling member 9 is adapted to be moved from its signalling position into its non-signalling position, in which latter position it is arranged within the casing 1 as shown in Figure 3, by means which consists of a flexible member or chain 12 connected at one end to the signalling member, a pull or rod 13 connected to the other end of the chain 12, and a handle 14 and secured to the rod. The inner lateral wall of the casing 1 and the door 3 are provided with openings 15 for the reception of the chain 12 and rod 13. This means is adapted to secure the signalling member 9 in non-signalling position, and is also adapted to limit the movement of the signalling member by the spring 11. When the signalling member 9 is in non-signalling position, the rod 13 is located wholly within the automobile and is engaged with a hook 16 secured to the inner side of the door 3, the position of the rod and its engagement with the hook, serving to secure the signalling member in non-signalling position. When it is desired to release the signalling member 9 so as to permit of its being moved into signalling position by the spring 11, the rod 13 is withdrawn from engagement with the hook 16 and positioned to permit it to pass through the openings 15. The spring 11 will, when the rod 13 is in this position, move the signalling member 9, chain 12 and rod 13 in an outward direction with respect to the casing 1, and this movement of these parts will continue until the handle 14 contacts with a stop plate or escutcheon 17 secured to the door 3 about the opening 15 therein. The contact of the handle 14 with the plate 17 stops the movement of the signalling member 9 by the spring 11 and when said member is thus brought to a stop it will be in a horizontally projected position with respect to the casing 1. When it is desired to retract or move the signalling member 9 into non-signalling position, an inward pull is exerted on the handle 14, and when the rod 13 is located wholly within the automobile it is engaged with the hook 16, the rod being held against upward displacement from the hook by the handle 14.

An electric lamp 18 is arranged within the lower end of the casing 1 to illuminate the signalling member 9 at night when it is in signalling position. The lamp is of the incandescent type, and is connected by leads 19 in circuit with the lamp of the stop light signal of the automobile so that both lamps will be simultaneously lighted and extinguished. The stop light signals of automobiles are usually associated with tail lights, and the lamp circuits of said signals are under the control of the brake pedals and are closed when the pedals are depressed to effect the application of the brakes. A mirror 20 is secured to the rear side of the casing 1 over the opening 6, and bears the word "Stop" in transparent letters. When the lamp 18 is lit as the result of the depressing of the brake pedal, the word "Stop" and the signalling member 9 will also be illuminated, with the result that the driver may simultaneously indicate his intention to stop and thereafter make a right or left turn. The lamp 18 is removably secured within a socket 21 arranged within the lower end of the casing 1, and may be readily removed and replaced after first opening the door 8. To prevent the accumulation of water in the casing, the bottom wall of same is provided with an opening 22.

From the foregoing and accompanying drawing, it should be apparent that when the driver wishes to indicate his intention to make a right or left turn it is only necessary to disengage the pull 13 from the hook 16, raised in alinement with the opening in the plate 17 and then release the same. When the pull 13 is released, the spring 11 will move the signalling member or hand 9 into signalling position.

What is claimed is:

An automobile signal, comprising a casing, a signalling member pivotally mounted in the casing, a spring member terminally engaging the signalling member and the casing and adapted to normally urge the signalling member into signalling position, a flexible member engaging said signalling member and extending through an opening in the casing, a pull rod engaging said flexible member, and having a handle thereon, and a hook member to engage said pull rod when the signalling member is in non-signalling position to hold it from movement by the spring member, said pull rod being adapted to extend through the opening in the casing to release the signalling member to movement into signalling position.

In testimony whereof I affix my signature.

PERFECTO NUANEZ.